(12) United States Patent
Triebenbacher et al.

(10) Patent No.: US 11,473,948 B2
(45) Date of Patent: Oct. 18, 2022

(54) MAGNETICALLY INDUCTIVE FLOWMETER INCLUDING A COIL SYSTEM HAVING MEANS FOR FIELD GUIDE-BACK

(71) Applicant: Endress+Hauser Flowtec AG, Reinach (CH)

(72) Inventors: Simon Triebenbacher, Basel (CH); Raphael Hess, Reinach (CH); Oliver Graf, Känerkinden (CH)

(73) Assignee: ENDRESS+HAUSER FLOWTEC AG, Reinach (CH)

( * ) Notice: Subject to any disclaimer, the term of this patent is extended or adjusted under 35 U.S.C. 154(b) by 201 days.

(21) Appl. No.: 16/956,969

(22) PCT Filed: Dec. 10, 2018

(86) PCT No.: PCT/EP2018/084182
§ 371 (c)(1),
(2) Date: Jun. 22, 2020

(87) PCT Pub. No.: WO2019/121107
PCT Pub. Date: Jun. 27, 2019

(65) Prior Publication Data
US 2020/0393276 A1    Dec. 17, 2020

(30) Foreign Application Priority Data

Dec. 22, 2017    (DE) .................... 10 2017 131 202.1

(51) Int. Cl.
*G01F 1/58*    (2006.01)
*G01F 1/60*    (2006.01)

(52) U.S. Cl.
CPC .............. *G01F 1/584* (2013.01); *G01F 1/586* (2013.01); *G01F 1/60* (2013.01)

(58) Field of Classification Search
None
See application file for complete search history.

(56) References Cited

U.S. PATENT DOCUMENTS

| 3,633,401 A | 1/1972 | Wada |
| 4,459,857 A | 7/1984 | Murray et al. |
| (Continued) | | |

FOREIGN PATENT DOCUMENTS

| CN | 1113318 A | 12/1995 |
| DE | 1923071 A1 | 11/1969 |
| (Continued) | | |

*Primary Examiner* — Harshad R Patel
(74) *Attorney, Agent, or Firm* — Mark A. Logan; Endress+Hauser (USA) Holding Inc.

(57) ABSTRACT

A magnetically inductive flowmeter includes a measuring tube having a tube axis and a tube wall; a magnet system for producing a magnetic field that extends perpendicularly to the tube axis; at least one pair of measuring electrodes for sensing an electrical voltage induced in the medium by the magnetic field; and an electronic measuring/operating circuit for operating the magnet system and the measuring electrodes. The magnet system includes a coil system having a coil having a coil core and further includes two pole shoes. The coil system includes a field guide-back, wherein a tangential fraction of the magnetic field in the coil relative to the measuring tube axis amounts to at least 90% of the total magnetic field. The field guide-back has a guide-back part that extends through the coil and forms the coil core of the coil.

14 Claims, 6 Drawing Sheets

(56) References Cited

U.S. PATENT DOCUMENTS

| | | | |
|---|---|---|---|
| 4,726,236 A | 2/1988 | Wada | |
| 2014/0157910 A1* | 6/2014 | Voigt | G01F 1/586 |
| | | | 73/861.11 |
| 2020/0200575 A1* | 6/2020 | Tschudin | G01F 1/588 |

FOREIGN PATENT DOCUMENTS

| | | |
|---|---|---|
| DE | 3501768 A1 | 7/1986 |
| DE | 19958285 A1 | 6/2001 |
| DE | 202012104036 U1 | 1/2014 |
| DE | 202012104036 U1 | 2/2014 |
| DE | 102015120730 A1 | 6/2017 |
| DE | 102015122664 A1 | 6/2017 |
| GB | 1095915 | 12/1967 |
| GB | 1095915 A | 12/1967 |

* cited by examiner

MAGNETICALLY INDUCTIVE FLOWMETER INCLUDING A COIL SYSTEM HAVING MEANS FOR FIELD GUIDE-BACK

CROSS-REFERENCE TO RELATED APPLICATIONS

The present application is related to and claims the priority benefit of German Patent Application No. 10 2017 131 202.1, filed on Dec. 22, 2017 and International Patent Application No. PCT/EP2018/084182, filed on Dec. 10, 2018 the entire contents of which are incorporated herein by reference.

TECHNICAL FIELD

The invention relates to a magnetically inductive flowmeter for measuring volume flow or flow velocity of a medium flowing through a measuring tube.

BACKGROUND

Magnetically inductive flowmeters are based on measuring an electrical voltage induced in an electrically conductive medium by a magnetic field and the electrical voltage is linearly dependent on the applied magnetic field and on the volume flow of the medium through the measuring tube.

The magnetic field is usually produced by means of a magnet system having at least one coil. Thus, for example, DE102015122664A1 discloses a magnetically inductive flowmeter in which a magnetic field perpendicular to a measuring tube axis is produced by means of two coils, wherein the coil axes are perpendicular to the measuring tube axis. The magnetic field outside of the measuring tube and outside of the coils is led between the two coils by means of a field guide, wherein a magnetic connection between coil core of a coil and field guide as well as between measuring tube and coil core is produced, in each case, by means of a pole shoe. Since each connection represents an interruption of the magnetic flux, such connection degrades the performance of the flowmeter. Moreover, the concentration of the production of the magnetic field in the region of the coils means that many turns of a coil wire must be applied in a narrow spatial region. This leads to a lessened heat emission and to a waste of costly raw materials, since many turns in a narrow spatial region can be accomplished only by using a large number of winding layers.

SUMMARY

An object of the invention is, consequently, a magnetically inductive flowmeter that at least lessens at least one of the aforementioned disadvantages.

A magnetically inductive flowmeter of the invention for measuring volume flow or flow velocity of a medium flowing through a measuring tube comprises:

the measuring tube having a measuring tube axis and a measuring tube wall;

a magnet system for producing a magnetic field that extends perpendicularly to the measuring tube axis, wherein the magnet system is placed on an outside of the measuring tube;

at least one pair of measuring electrodes that are coupled capacitively or galvanically with the medium located in the measuring tube, wherein the measuring electrodes are adapted to sense an electrical voltage induced in the medium by the magnetic field, wherein a first measuring electrode of the pair of measuring electrodes is arranged on a first side of the measuring tube and a second measuring electrode of the pair of measuring electrodes is arranged on a second side of the measuring tube;

an electronic measuring/operating circuit for operating the magnet system and the measuring electrodes as well as for providing measured values of flow, wherein the magnet system comprises:

a coil system having at least one coil having a coil core;

two pole shoes that are arranged on opposite sides of the measuring tube, wherein the pole shoes are adapted to transfer the magnetic field produced by the coil system into the measuring tube as well as to receive the magnetic field that has passed through the measuring tube and to lead the magnetic field back to the coil system;

wherein the coil system has a means for field guide-back that is adapted to lead the magnetic field outside of the measuring tube between the pole shoes, characterized in that a tangential fraction of the magnetic field in the coil relative to the measuring tube axis amounts to at least 80% and especially at least 90% of the total magnetic field, wherein the means for field guide-back has at least one guide-back part that extends through at least one coil and forms the coil core of the at least one coil.

A measuring tube can be described by means of a cylindrically symmetrical coordinate system comprising a radial coordinate, an axial coordinate and a tangential coordinate. The tangential fraction of the magnetic field is, thus, the part of the magnetic field that is oriented along the tangential coordinate. The tangential orientation of the at least one coil on the measuring tube and the extension of the field guide-back through the coil eliminates a transition at each pole shoe between a field guide and a coil core by combining the field guide-back and at least one coil core into one unit to eliminate a connection of two components. In this way, a magnetic resistance of the magnet system is reduced. A minimum fraction of 80% of the tangential fraction to the total magnetic field can leave room for an easy axial or radial orientation of the coil along the associated guide-back part.

The pole shoes are, in each case, produced preferably of at least one non-grain oriented sheet metal piece and lie against the measuring tube.

In an embodiment, the guide-back part comprises at least one ply of electrical sheet metal that meets the requirements of the standard, DIN EN 10106 edition 2007-11, or wherein the electrical sheet metal is especially grain oriented and meets the requirements of the standard, DIN EN 10107 edition 2005-10, wherein the grain orientation is parallel to the magnetic flux in the guide-back part.

A grain orientation of a magnetically conductive material provides a non-isotropic magnetic conductivity, wherein a magnetic resistance of the material along the grain orientation is minimum. By orienting the grain orientation along the magnetic flux of the magnetic field in the guide-back, thus, the magnetic resistance of the magnet system is lessened.

In an embodiment, the coil has at most 15 winding plies and especially at most 10 winding plies and preferably at most 5 winding plies.

In this way, the use of raw materials applied for winding the coil, such as, for example, copper or silver, can be minimized. Moreover, this lessens the danger of an overheating of the coils, which results from high current flow in the coil and many winding layers.

In an embodiment, a length of the coil along its longitudinal axis subtends an angle α of at least 2 degrees, and especially at least 5 degrees and preferably at least 10 degrees about the measuring tube axis. A greater length contributes to reducing the number of winding plies.

In an embodiment, there is arranged on the first side and the second side of the measuring tube, in each case, at least one coil with an associated guide-back part.

A two-sided arrangement of coils and associated guide-back parts contributes to an equally formed magnetic flux in the pole shoes, this leading to a spatially homogeneous distribution of the magnetic field in the region of the measuring electrodes.

In an embodiment, the measuring tube has extending along the measuring tube axis two far regions, a central region, and two intermediate regions, wherein, in each case, an intermediate region is arranged between a far region and the central region, wherein the measuring tube has in its far regions, in each case, a flange and a collar that are adapted to be connected to a pipeline, wherein the at least one measuring electrode pair is arranged in the central region.

In an embodiment, the pole shoes and/or guide-back parts and/or coils are, in each case, arranged symmetrically relative to a cross- and/or longitudinal section of the measuring tube.

By increasing a degree of symmetry of the magnet system, a spatial distribution of the magnetic field in the region of the measuring electrodes can be formed homogeneously.

In an embodiment, the pole shoes subtend in the central region an angle $\beta_M$ of at least 40 degrees and especially at least 80 degrees and preferably at least 120 degrees about the measuring tube axis, wherein the pole shoes are separated from one another by two gaps, wherein each gap subtends an angle $\gamma$ of at least 5 degrees and especially at least 10 degrees and preferably at least 15 degrees about the measuring tube axis.

In this way, the distribution of the magnetic field in the measuring tube can be adapted. The minimum extension of the gap between the pole shoes contributes to preventing a magnetic short circuit, in the case of which a magnetic flux in the measuring tube would be disturbed.

In an embodiment, the guide-back part is arranged in the central region and includes especially at least one feedthrough for contacting a measuring electrode, wherein the guide-back part extends through at least one coil, and preferably through two coils, wherein the at least two coils are arranged on opposite sides relative to the corresponding measuring electrode.

In an embodiment, the pole shoes subtend in the intermediate regions about the measuring tube axis, in each case, an angle $\beta_Z$, which is less than the angle $\beta_M$ by at least 30 degrees and especially at least 40 degrees and preferably at least 50 degrees, wherein the field guide-back has on the first side and/or second side at least two guide-back parts, which magnetically connect the pole shoes, in each case, in an intermediate region.

In an embodiment, the magnet system includes a shielding apparatus that is adapted to minimize magnetic disturbing influences of the flanges and collars, wherein the shielding apparatus has at least one shielding band that at least partially surrounds the measuring tube, wherein the shielding band is arranged between a flange and the central region or on a side of the collar facing the central region, wherein the shielding band is made of a magnetically conductive material, wherein the shielding band is, for example, one piece or composed of a plurality of band portions.

This contributes to an increasing of a possible switching frequency of the magnet system as well as to longer measuring times, since magnetic disturbing influences caused by currents induced in the flanges and collars in the measuring electrode region fall faster under a critical limit.

In an embodiment, the shielding apparatus has two shielding bands, each of which is associated with a flange.

In an embodiment, the guide-back part has at least 5 and especially at least 10 and preferably at least 15 plies of electrical sheet metal. In this way, the magnetic conductivity of the guide-back part can be improved.

In an embodiment, the measuring tube has an inner diameter of at least 0.35 meters and especially at least 1 meter and preferably at least 1.5 meters.

Especially in the case of measuring tubes with large tube diameters, the invention provides great advantages regarding the performance of the flowmeter.

BRIEF DESCRIPTION OF THE DRAWINGS

The invention will now be described based on examples of embodiments presented in the appended drawing, the figures of which show as follows:

FIGS. 3 a) to c) show schematic side views of alternative embodiments of a magnetically inductive flowmeter of the present disclosure.

DETAILED DESCRIPTION

Figure 1:
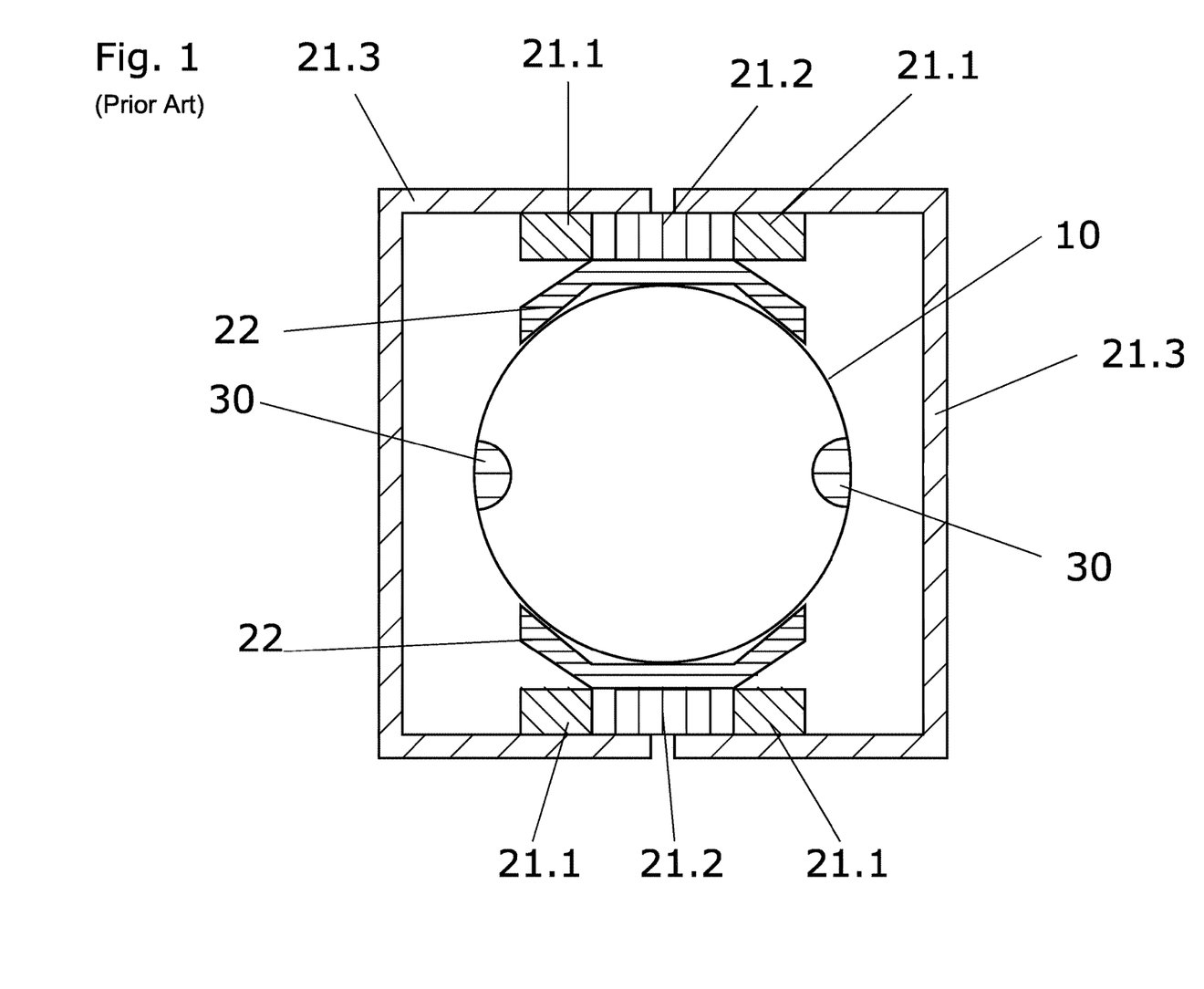
FIG. 1 shows a typical magnetically inductive flowmeter according to the state of the art.

FIG. 1 shows a cross section of a known, magnetically inductive flowmeter, wherein the flowmeter includes a measuring tube 10, measuring electrodes 30, and a magnet system with two coils 21.1 arranged on opposite sides of the measuring tube, each of the two coils 21.1 has a coil core 21.2, wherein, in each case, a pole shoe 22 is adapted to guide the magnetic field between measuring tube and the coil and to form its spatial distribution in the measuring tube. The magnetic flux outside of the measuring tube between the measuring tube far sides of the coils is guided by means of a field guide-back. The magnetic flux is degraded at the transitions between field guide-back and the coil, as well as between the coil and the pole shoe. Moreover, in order to embody the coil spatially compactly, a large number of winding layers of coil wire are necessary, which, however, is disadvantageous due to the consumption of coil wire and also is problematic due to a possible overheating of the coil.

Figure 2:
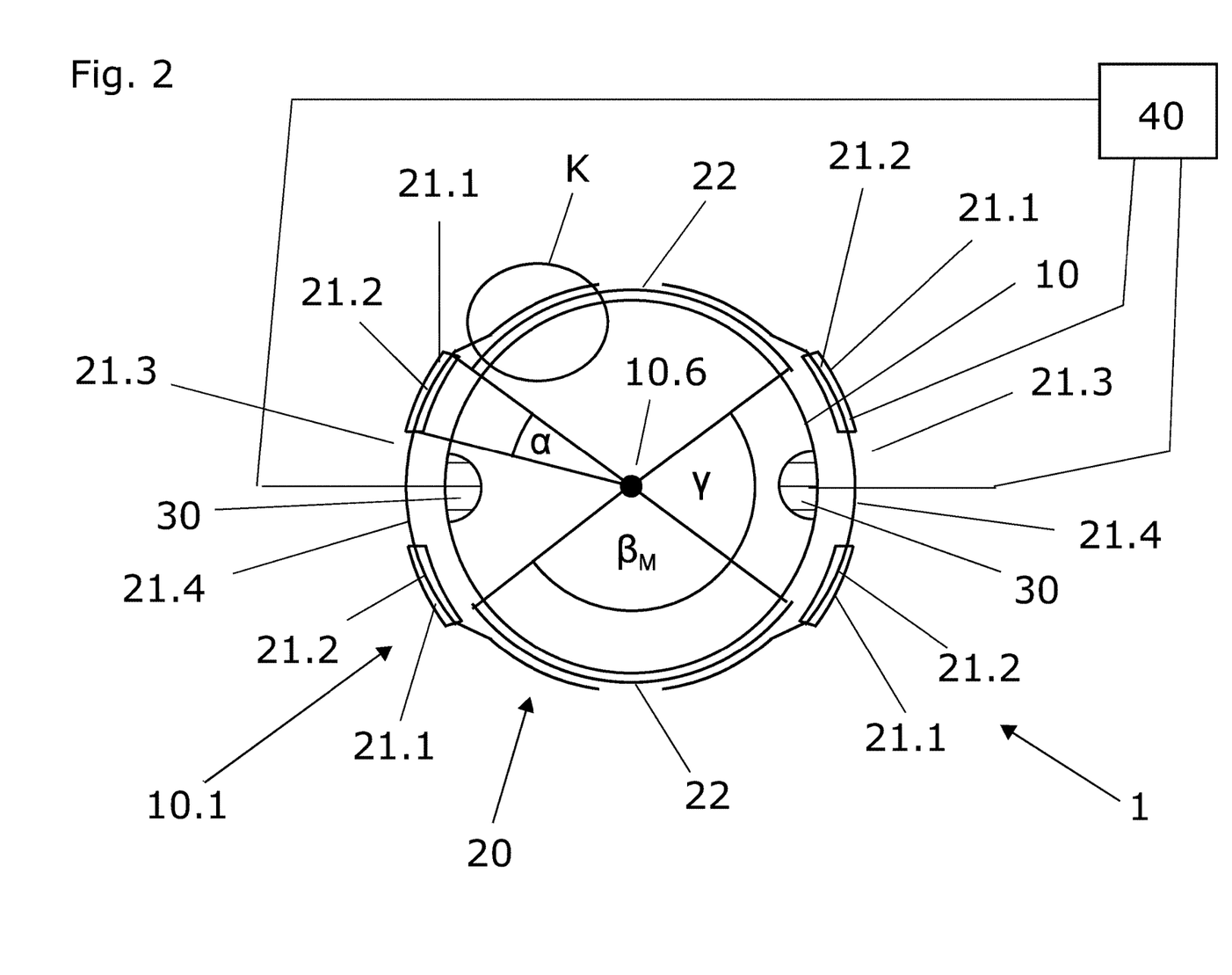
FIG. 2 shows a cross section of a magnetically inductive flowmeter of the present disclosure.

FIG. 2 shows in the form of a simplified cross-sectional drawing a schematic construction of an example of a magnetically inductive flowmeter 1 of the invention in a central region 10.1 of the measuring tube 10. The flowmeter 1 includes a measuring tube 10, a magnet system 20, a pair of measuring electrodes 30 arranged in the measuring tube, and an electronic measuring/operating circuit 40 that is adapted to operate the measuring electrodes 30 and the magnet system 20 as well as to provide measured values of flow. For illustrative reasons, electrical connections are shown between the measuring electrodes and the electronic measuring/operating circuit 40 and only between one coil and the electronic measuring/operating circuit 40. The magnet system 20 includes a coil system 21 and two pole shoes 22 that are adapted to conduct the magnetic field produced by the coil system 21 between coil system 21 and measuring tube 10 and to determine the spatial distribution of the magnetic field in the measuring tube. The coil system includes four coils 21.1 with, in each case, a coil core 21.2, and a field guide-back 21.3 with two guide-back parts 21.4 that are arranged on opposite sides of the measuring tube and extend through, in each case, two coils 21.1 and, thus, form the coil cores 21.2 of the associated coils. The pole shoes have, in each case, a thin sheet metal piece and lie as shown in FIG. 2 against the measuring tube 10. The field guide-back 21.3 is, in such case, magnetically coupled with the pole shoes 22 in four contact areas K, wherein the guide-back parts 21.4 lie as shown in FIG. 2 against the pole shoes 22. The deviating representation is, in such case, for the purpose of making the individual components of the magnetically inductive flowmeter recognizable. The provision of the guide-back parts 21.4 as coil cores 21.2 enables the coils to be oriented in the tangentially to the measuring tube. This can enlarge a length of the coils along a coil axis and lessen the number of winding layers, this leading to a saving of material and at least reducing excess heating of the coil in measurement operation. The length of the coil along its longitudinal axis relative to the measuring tube axis 10.6 subtends an angle α of at least 2 degrees, and especially at least 5 degrees and preferably at least 10 degrees. Additionally, due to the construction of the invention, the transition between a coil core and a guide-back part is omitted since the guide-back parts assume the function of at least one coil core whereby the magnetic resistance of the coil system is reduced.

For an advantageous spatial formation of the magnetic field in the region of the measuring electrodes 20, the pole shoes subtend in the central region 10.1 of the measuring tube 10 relative to the measuring tube axis 10.6 an angle $\beta_M$ of at least 40 degrees and especially at least 80 degrees and preferably at least 120 degrees, wherein the pole shoes are separated from one another by two gaps, wherein each gap has an angle γ of at least 5 degrees and especially at least 10 degrees and preferably at least 15 degrees. The gaps are adapted to prevent a magnetic short circuit between the pole shoes.

The guide-back parts can have a feedthrough (not shown) for measuring electrode contacting.

A magnetically inductive flowmeter of the invention is not limited to four coils and two guide-back parts. A flowmeter of the invention may have n1 coils and n2 guide-back parts, wherein n1 and n2 are natural numbers and n2<n1+1.

Figure 3:
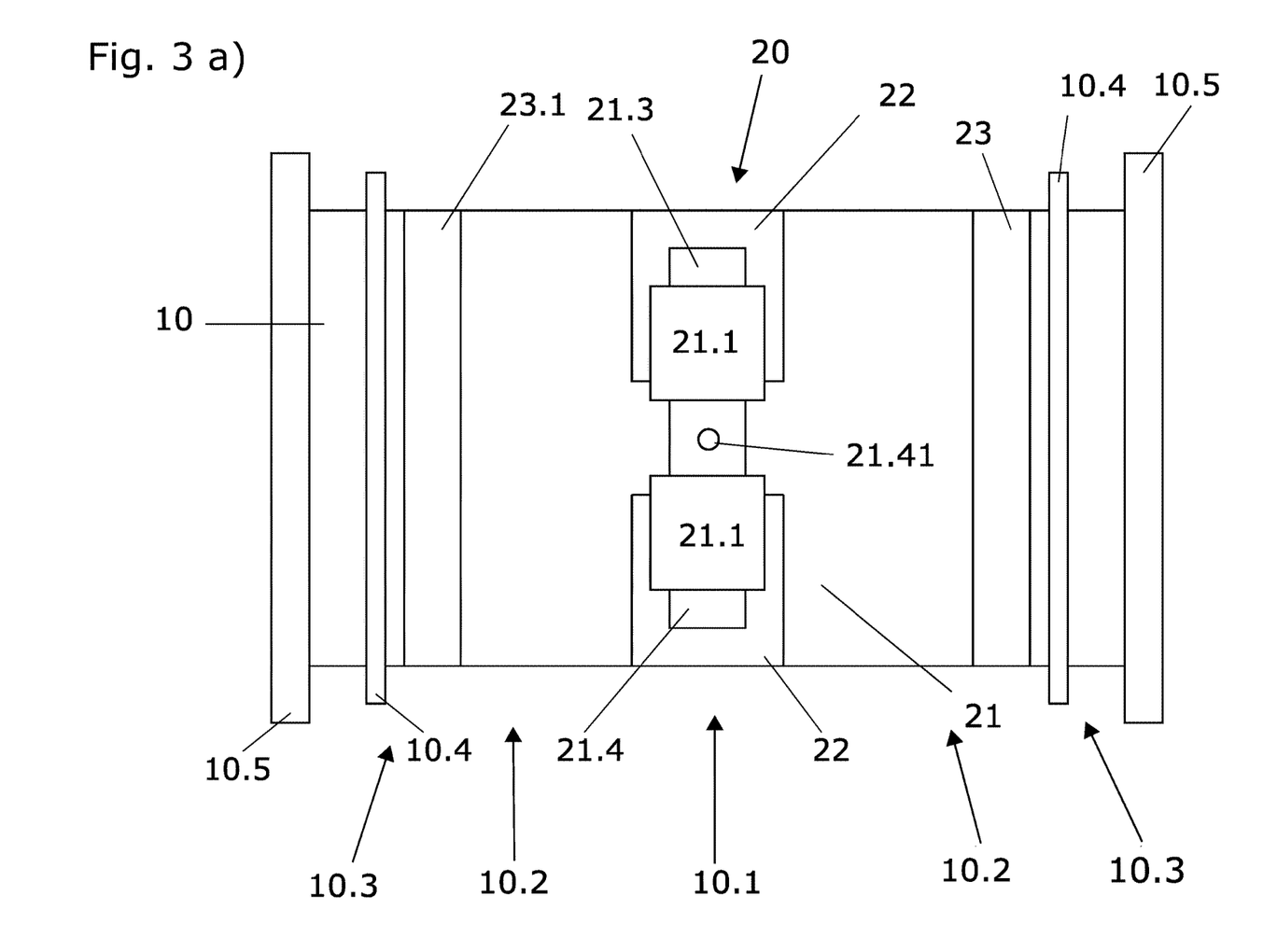

FIGS. 3 a) to c) show schematic, side views of alternative examples of embodiments of a magnet system of a magnetically inductive flowmeter of the invention, wherein FIG. 3a) has a measuring tube 10 with a magnet system 20 arranged thereon in a central region 10.1 of the measuring tube 10, wherein the magnet system has on the shown side a coil system 21 with two pole shoes and a guide-back part 21.4 of a field guide-back 21.3. The field guide-back part 21.4 includes in its central region a feedthrough 21.41 for a measuring electrode contacting. The measuring tube includes in far regions 10.3, in each case, a flange 10.5 and a collar 10.4, wherein the flanges are adapted to insert the flowmeter into a pipeline system, wherein the collars are adapted to be able to position a jacket around the measuring tube, wherein the jacket can have shielding sheet metal pieces to shield the magnet system from external fields.

FIG. 3 b) shows a magnet system that is symmetric relative to a measuring tube cross section, wherein the shown coil system in FIG. 3 a) is doubly embodied and symmetrically arranged relative to the cross section. In this way, the electrical connection of the measuring electrodes 30 to the electronic measuring/operating circuit can be embodied without a feedthrough 21.41 such as shown in FIG. 3a). The flux of the magnetic field in the guide-back parts is, thus, not hindered. Alternatively, an option is, for example, to provide only one coil 21.1 per guide-back part 21.4.

FIG. 3 c) shows another opportunity for providing a magnet system of the invention, wherein the pole shoes subtend in the intermediate regions 10.2 a lesser angle $\beta_Z$ relative to the measuring tube axis. Angle β3z more clearly shown in FIG. 4.

Common to the embodiments of the magnet systems shown in FIGS. 3a) to 3c) is as follows: The magnetic field produced by the coil system causes in the flanges 10.5 and in the collars 10.4 electrical currents, which, in turn, disturb the magnetic field in the region of the measuring electrodes and lessen the measuring power of the flowmeter. In order to lessen these disturbing influences, the magnet system includes a shielding apparatus 23 comprising two shielding bands 23.1 that are arranged on the coil system 21 facing sides of the collars, or flanges. The shielding bands comprise a magnetically conductive material and thereby lessen propagation of the disturbing influences to the measuring electrodes.

The magnet system includes on the side of the measuring tube opposite the shown side preferably at least one other coil and at least one other guide-back part, which advantageously are arranged symmetrically to the shown coils as well as to the guide-back parts relative to a longitudinal section of the measuring tube.

Figure 4:
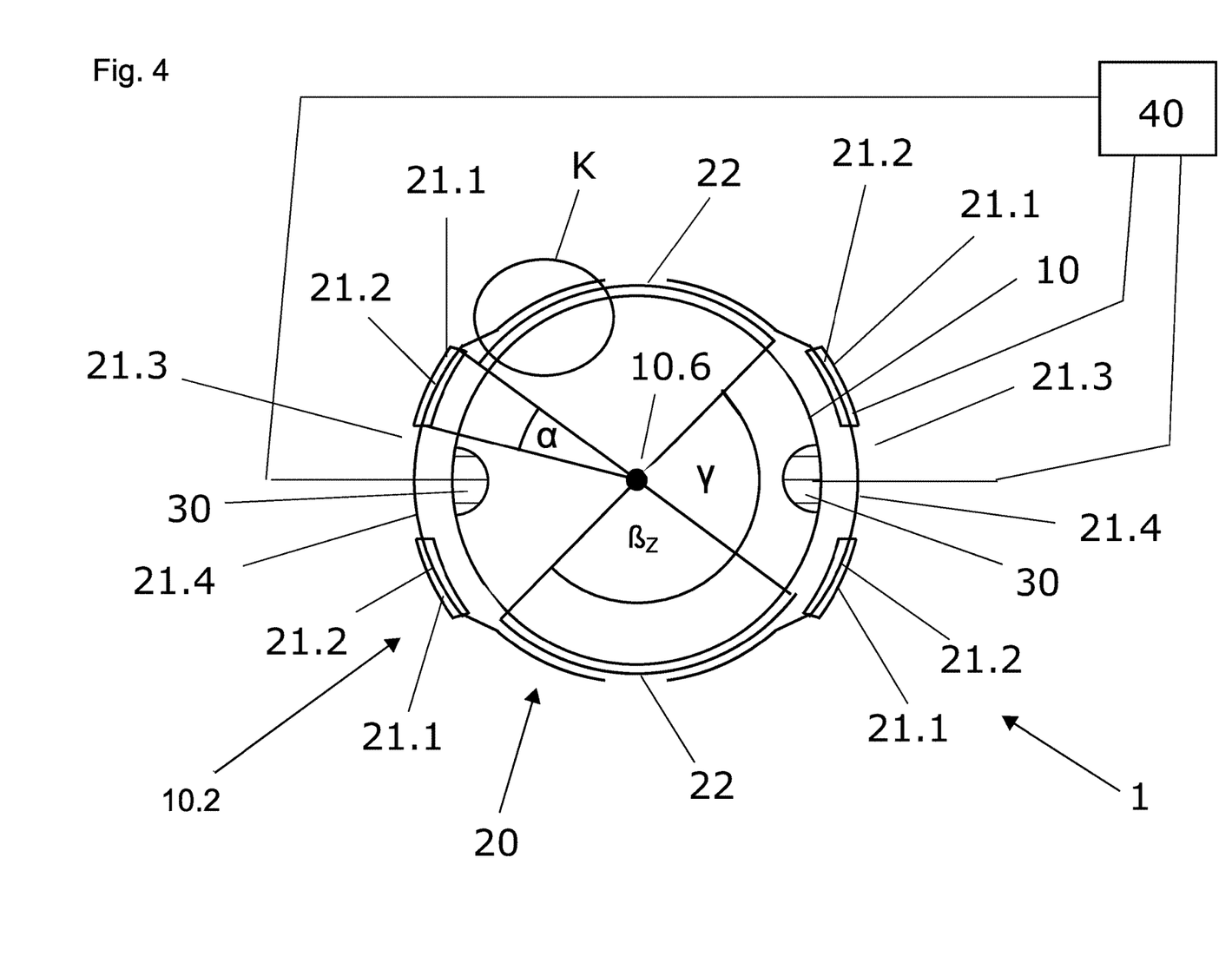
FIG. 4 shows a second cross section of a magnetically inductive flowmeter according to the present disclosure.

The cross section of the of the inductive flowmeter as shown in FIG. 4 is taken at the intermediate region 10.2 of the measuring tube 10. Shown in FIG. 4 is the angle $\beta_Z$ about which the pole shoes 22 subtend in the intermediate region 10.2 of the measuring tube 10. The angle $\beta_Z$ is also shown implicitly in FIG. 3c in which the pole shoes 22 do not wrap around the measuring tube 10 in the intermediate region 10.2 as they do in the central region 10.1.

The invention claimed is:

1. A magnetically inductive flowmeter for measuring volume flow or flow velocity of a medium flowing through a measuring tube, comprising:
the measuring tube having a measuring tube axis and a measuring tube wall;
a magnet system for producing a magnetic field perpendicular to the measuring tube axis, wherein the magnet system is placed on an outside of the measuring tube;
at least one pair of measuring electrodes that are coupled capacitively or galvanically with the medium located in the measuring tube, wherein the measuring electrodes are adapted to sense an electrical voltage induced in the medium by the magnetic field, wherein a first measuring electrode of the pair of measuring electrodes is arranged on a first side of the measuring tube and a second measuring electrode of the pair of measuring electrodes is arranged on a second side of the measuring tube; and
an electronic measuring/operating circuit for operating the magnet system and the measuring electrodes,
wherein the magnet system includes:
a coil system having at least one coil having a coil core; and
two pole shoes that are arranged on opposite sides of the measuring tube and are adapted to transfer the magnetic field produced by the coil system into the measuring tube, to receive the magnetic field that has passed through the measuring tube, and to lead the magnetic field back to the coil system, wherein the coil system has a means for field guide-back that is adapted to lead the magnetic field outside of the measuring tube between the pole shoes, wherein a fraction of the magnetic field in the at least one coil that is tangential to the measuring tube axis amounts to at least 90% of the total magnetic field, wherein the means for field guide-back has at least one guide-back part that extends through the at least one coil and forms the coil core of the at least one coil.

2. The flowmeter as claimed in claim 1,
wherein the at least one guide-back part has at least one ply of electrical sheet metal and the electrical sheet metal is grain oriented in parallel with the magnetic flux in the at least one guide-back part.

3. The flowmeter as claimed in claim 1,
wherein the at least one coil has at most 15 winding plies.

4. The flowmeter as claimed in claim 1,
wherein a length of the at least one coil along its longitudinal axis subtends an angle $\alpha$ of at least 2 degrees about the measuring tube axis.

5. The flowmeter as claimed in claim 1,
wherein the coil system further has a second coil having coil core,
wherein the means for field guide-back further has a second guide-back part, and the second guide-back part extends through the second coil and forms the coil core of the second coil,
wherein a first coil of the two coils is arranged on the first side of the measuring tube and the second coil of the two coils is arranged on the second side of the measuring tube, in each case, with the coil's associated guide-back part.

6. The flowmeter as claimed in claim 5,
wherein the pole shoes, guide-back parts, and the coils are, in each case, arranged symmetrically relative to a cross- and/or longitudinal section of the measuring tube.

7. The flowmeter as claimed in claim 6,
wherein the pole shoes in the central region subtend an angle $\beta_M$ of at least 40 degrees about the measuring tube axis, and
wherein the pole shoes in the central region are separated from one another by two gaps, wherein each gap subtends an angle $\gamma$ of at least 5 degrees about the measuring tube axis.

8. The flowmeter as claimed in claim 7,
wherein the pole shoes subtend in the intermediate regions about the measuring tube axis, in each case, an angle $\beta_Z$, which is less than the angle $\beta_M$ by at least 30 degrees,
wherein the field guide-back has on the first side and/or second side at least two guide-back parts that magnetically connect the pole shoes, in each case, in an intermediate region.

9. The flowmeter as claimed in claim 6,
wherein each guide-back part is arranged in the central region and has at least one feedthrough, and
wherein the two coils are arranged on opposite sides relative to the corresponding measuring electrode.

10. The flowmeter as claimed in claim 5,
wherein ach guide-back part has at least 5 plies of electrical sheet metal.

11. The flowmeter as claimed in claim 1,
wherein the measuring tube has extending along the measuring tube axis two far regions, a central region, and two intermediate regions, wherein, in each case, an intermediate region is arranged between a far region and the central region,
wherein the measuring tube has in its far regions, in each case, a flange and a collar, wherein each flange is adapted to be connected to a pipeline,
wherein the at least one measuring electrode pair is arranged in the central region.

12. The flowmeter as claimed in claim 11,
wherein the magnet system includes a shielding apparatus adapted to minimize magnetic disturbing influences of the flanges and collars,
wherein the shielding apparatus has at least one shielding band that at least partially surrounds the measuring tube, wherein the at least one shielding band is arranged between a far region flange and the central region or on a side of a far region collar facing the central region,
wherein the shielding band is made of a magnetically conductive material,
wherein the shielding band is one piece or composed of a plurality of band portions.

13. The flowmeter as claimed in claim 12, wherein the shielding apparatus has a second shielding band, wherein each shielding band is associated with a flange of the two far region flanges.

14. The flowmeter as claimed in claim 1,
wherein the measuring tube has an inner diameter of at least 0.35 meters.

* * * * *